Patented June 17, 1941

2,245,736

UNITED STATES PATENT OFFICE 2,245,736

METHOD OF OBTAINING BORAX SOLUBLE ZEANIN

Lloyd C. Swallen and Harold Reintjes, Pekin, Ill., assignors, by mesne assignments, to Corn Products Refining Company, New York, N. Y., a corporation of New Jersey No Drawing. Application December 24, 1937, Serial No. 181,615

4 Claims. (Cl. 260—112)

This invention relates to the treatment of zeanin to render the same readily soluble, particularly in weak alkaline solutions. Zeanin (Biochemistry of the Amino Acids, Mitchell and Hamilton, 1929, Chemical Catalogue Company, New York) may be defined as the constituent of corn (maize) protein which is soluble in alkaline solutions but it is insoluble in alcohol and salt solutions. It is a glutelin and, therefore, comes within the above definition (Thorpe Dictionary of Applied Chemistry, vol. 5, page 464, 1924, Longmans, Green & Co., London).

For the extraction of zeanin from corn, the corn meal or mixed corn protein, such as gluten meal, is first treated, by any known method, for the removal of the alcohol soluble protein zein. The zein may be removed, for example, by treating the material with 92% alcohol followed by a 70% alcohol extraction. The zein-free meal, which has preferably been washed with water to remove the alcohol is then treated at room temperature (about 70° F. or 21° C.) with a dilute alkali solution, for example, with 0.3% sodium hydroxide, using such proportions that a final pH of approximately 12.0–12.2 is obtained. The time of extraction, according to the methods heretofore employed, is approximately 3 hours. The extract is then clarified by means of a centrifugal clarifier and acidified, for example, with acetic acid or a mineral acid, to a pH of 5.4 to precipitate the zeanin.

By the above described method good yields can be obtained but the product is only slightly soluble in borax solution. There are technical advantages in the utilization of products of this class in having them soluble to a large extent in weak alkaline solutions, such as borax solutions instead of being soluble only in strong alkaline solutions.

It has now been found that a combination of extracting conditions will produce definite solubility characteristics in the protein and that by properly controlling these conditions a product can be readily obtained having a borax solubility in excess of 95%. The present invention is based on the discovery that the solubility of the zeanin is caused by a reaction which requires an ageing period to convert or modify the zeanin to a material that is borax soluble. It has further been found that the speed of this reaction can be increased by running the extraction at more elevated temperatures and that higher alkalinities also favorably affect the reaction.

The ageing operation may be effected either during the extracting operation or after removal of the insoluble material but before recovery of the zeanin from the extract. However, regardless of the point at which the ageing takes place, the conditions as to both temperature and pH are important factors. In other words, the ageing operation, as referred to herein, involves more than a mere lapse of time. For example, if the extraction period is extended for 18 hours and the temperature is low, the borax solubility of the protein will be poor, even though pH may be as high as 12.4.

Therefore, owing to the presence of three variable factors in the ageing operation, namely, time, temperature and pH, and the various stages of operation at which all or a portion of the ageing may take place, it is difficult, if not impossible, to indicate any critical ranges. However, the following tables, based on experimental data, will serve as a guide in carrying out the invention, although it will be understood that the invention is not to be limited to the illustrative figures set forth in the tables in which the percentage of protein extracted is on the basis of the zein free material treated.

Table 1

| pH | Time | Temp. | Borax solubility | Protein extracted |
|---|---|---|---|---|
|  | Hours | °C. |  | Percent |
| 11.7 | 2 | 40 | Bad | 50.2 |
| 12.0 | 2 | 40 | do | 61.4 |
| 12.2 | 2 | 40 | do | 68.7 |
| 11.7 | 2 | 50 | do | 57.5 |
| 12.0 | 2 | 50 | do | 68.7 |
| 12.2 | 2 | 50 | do | 76.0 |
| 12.2 | 2 | 28 | do | 67.8 |
| 12.2 | 18 | 28 | Good | 77.2 |
| 12.2 | 18 | 40 | do | 83.8 |
| 12.2 | 18 | 50 | do | 91.2 |
| 12.4 | 18 | 8 | Bad | 67.8 |

The above table illustrates the results obtained by subjecting zein-free gluten meal to extraction under varying conditions. The figures illustrate that even for severe conditions of temperature and pH the time must be sufficient for completion of the solubilizing reaction on the protein. They also illustrate that with pH and time at a proper value good solubility can be obtained only so long as the temperature is correct.

Table 2

| pH | Time | Temp. | Borax solubility | Protein extracted |
|---|---|---|---|---|
|  | Hours | °C. | Percent | Percent |
| 12.1 | 2 | 28 | 27 | 70.8 |
| 12.3 | 24 | 8 | 75.7 | 81.1 |

Table 2 illustrates that the extraction temperature may be materially reduced if the time factor is increased. The first item of Table 2 shows the conditions heretofore employed in extracting zeanin, under which yields are satisfactory but the solubility is poor. Comparing the second item of this table with the last item of Table 1, it will be noted that a change of six hours in the time factor will, under otherwise identical conditions, make the difference between good and bad solubility.

*Table 3*

This table illustrates the increase in solubility obtained by allowing the extract, after removal of the insoluble material, to stand for varying periods of time before recovering the zeanin therefrom.

| Time | Borax solubility | pH | Ageing temperature |
|---|---|---|---|
|  | *Percent* |  | °C. |
| ½ hr | 57/8 | 12.4 | 27 |
| 16 hr | 96.4 | 12.2 | 27 |
| 40 hr | 98.1 | 12.2 | 27 |

The products of the second and third items of the above table may be considered as substantially soluble in borax solution.

In last analysis, the invention involves an ageing of the zeanin under proper conditions of temperature and pH, at least one of those factors constituting, for each extraction, an element of the ageing operation. In the illustrative data above set forth the ageing operation is performed prior to the recovery of the zeanin from the solution. It has also been found that the solubility of the zeanin recovered from the extract may be increased by boiling the protein in a dilute borax solution. For example, the product obtained under the conditions set forth in item 1 of Table 2, when boiled in dilute borax solution, will have a borax solubility of 96.5.

The practical temperature range will be between about 25° and 50° C. The ageing period (including extraction) should not, for practical reasons, be substantially less than sixteen hours. The practical pH figure will be not substantially less than 12. In any event, the ageing time in relation to temperature must be in excess of that required for the extraction of the zeanin when merely the question of yield is considered; and the time and temperature variables (one of which should be increased when the other is decreased) must be such as to give a product substantially soluble in a water solution of borax.

It is the intention to cover all variations and modifications within the scope of the following claims.

We claim:

1. Method of obtaining zeanin converted to borax solubility from the residue of corn gluten after extraction of zein therefrom which comprises: extracting the zeanin from said material with a caustic alkali and ageing the extract at a pH not substantially below 12, and at a temperature not substantially below 25° C. for a period of not substantially less than sixteen hours, in which change in the ageing time or temperature variable in one sense is accompanied by a change of another of said variables in the opposite sense.

2. Method of obtaining zeanin converted to borax solubility from the residue of corn gluten after extraction of zein therefrom which comprises: extracting the zeanin from said material with a caustic alkali and ageing the extract at a pH not substantially lower than 12 and for such extended period of time and at such temperature that the extracted protein matter is substantially soluble in borax solution.

3. Process of treating zeanin extracted from corn gluten protein which comprises: ageing a solution of said zeanin at a pH not substantially lower than 12 and for such extended period of time and at such temperature that the extracted protein matter is substantially soluble in borax solution.

4. Method of obtaining zeanin from corn gluten after the extraction therefrom of zein and converting the same to borax solubility which comprises: extracting the zeanin from said material with caustic alkali and ageing the extract at a pH of substantially 12.2 at a temperature of substantially 27° C. and for from 16 to 40 hours.

LLOYD C. SWALLEN.
HAROLD REINTJES.